Figure 1:
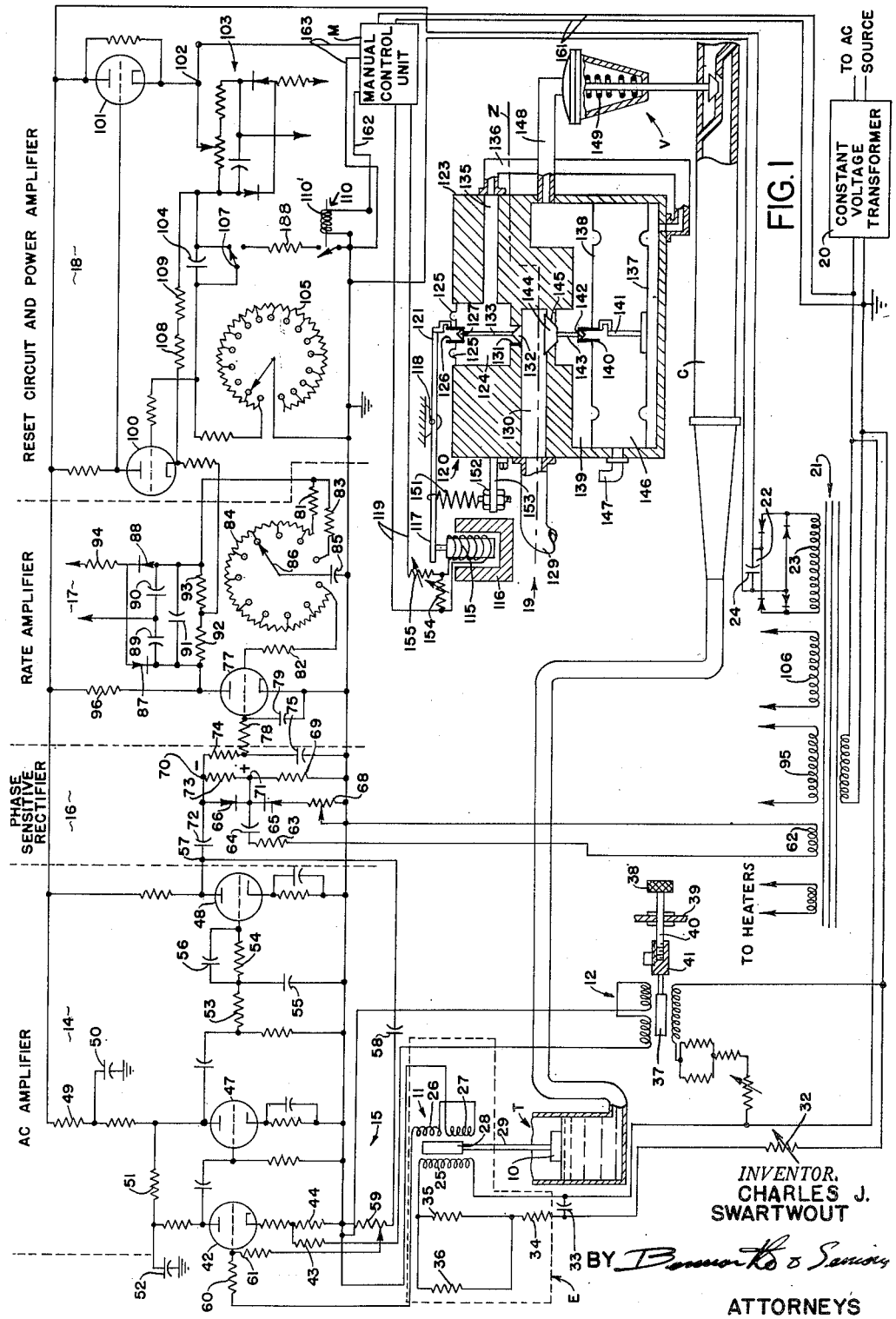

Aug. 14, 1956    C. J. SWARTWOUT    2,759,129
CONTROL SYSTEM
Filed Sept. 6, 1952    2 Sheets-Sheet 1

INVENTOR.
CHARLES J. SWARTWOUT
BY
ATTORNEYS

Aug. 14, 1956 C. J. SWARTWOUT 2,759,129
CONTROL SYSTEM
Filed Sept. 6, 1952 2 Sheets-Sheet 2

INVENTOR
CHARLES J. SWARTWOUT
BY
ATTORNEYS

United States Patent Office 2,759,129
Patented Aug. 14, 1956

2,759,129

CONTROL SYSTEM

Charles J. Swartwout, Chagrin Falls, Ohio, assignor to The Swartwout Company, Cleveland, Ohio, a corporation of Ohio Application September 6, 1952, Serial No. 308,278

39 Claims. (Cl. 317—123)

This invention relates to electronic control systems and more particularly to systems adapted for use in controlling industrial processes. Such systems are utilized for regulating an instrumentality or a plurality of instrumentalities in response to changes in one or more variables; for example, for controlling a valve or the like in response to variations in liquid level in a tank or in response to changes in temperature or pressure. The invention is described herein with particular relation to a system for controlling a valve in response to changes in a level in a tank in order to maintain the level at a set point, but it is to be understood that the system is of general application and that my invention is not limited to any particular field of use.

Industrial process control systems have been known and used for many years. Ordinarily, such systems have been entirely pneumatic; more recently, systems have been proposed that involve combinations of electric and pneumatic instrumentalities with mechanically moving parts such as slide wires and the like in the electrical portion. The arrangements usually are such that either time delays are encountered because of the pneumatic circuits, or sensitive and delicate electrical components must be placed immediately adjacent the apparatus being controlled and frequently in situations where ambient conditions are bad. Furthermore, most of the known electrical controls involve step by step rather than continuously variable response.

Accordingly, a general object of the present invention is to provide a control system that is primarily electrical, eliminates the difficulties of existing controls, provides superior response and regulation, is relatively sturdy and simple in construction and reliable in operation. Other objects of the invention are the provision of a control system in which there are no time delays in the transmission of a signal from one point to another so that the response is substantially instantaneous; the provision of a system in which mechanically moving parts and resulting friction and wear are eliminated except in the primary sensing element and the final controlling element, and in which, if desired, friction and wear can be eliminated at these points; the provision of a control system in which the response is continuous in all components, i. e., in which there are no mechanical or electrical devices that operate in a step by step manner; the provision of an electrical control system in which the response is continuous and which embodies adjustable proportional band, adjustable reset response and adjustable rate response or any of them; the provision of a control system that is electric up to the final instrumentality to be controlled, which may be operated by pneumatic, electric or other means; the provision of an improved means of modulating the air pressure in the pneumatic portion of a system embodying a pneumatic operator in proportion to the electric output of the control; the provision of a control system in which no delicate electric instrumentalities such as vacuum tubes are required either at the measuring element or at the final control element where ambient conditions may be poor; the provision of a control system in which the electric instrumentalities may be disposed at any convenient control point; the provision of a control system in which ordinary variations in line voltage and normal variations in vacuum tubes will not affect the accuracy and calibration of the system; the provision of a controlling system in which accurate control of the regulating valve means or the like in response to relatively small signals in the range of 0 to ½ volt is afforded; the provision of a control system in which reversal of response can be effected readily and in which desired fail-safe characteristics can be obtained with either direct or reverse response; the provision of an electrical control system in which the measuring or sensing element is a low impedance device, whereas the controlling system itself is a high impedance device, whereby the calibration of the sensing element remains steady and its output is not substantially affected by the operation of the control; the provision of a control system in which means are provided for effecting manual control of the controlled instrumentality and in which the control can be switched from manual to automatic control and vice versa without causing any substantial fluctuation in the value of the controlled variable; the provision of a control in which the automatic control elements can be disconnected or removed without disturbing the operation of the manual control; and the provision of a control system with a high degree of flexibility so that it can be adapted readily to various uses and purposes.

Referring now to the drawings, Figure 1 is a diagram of an automatic control system embodying my invention and showing the application of the system for the control of a valve in response to changes in the level in a tank.

Figure 2:
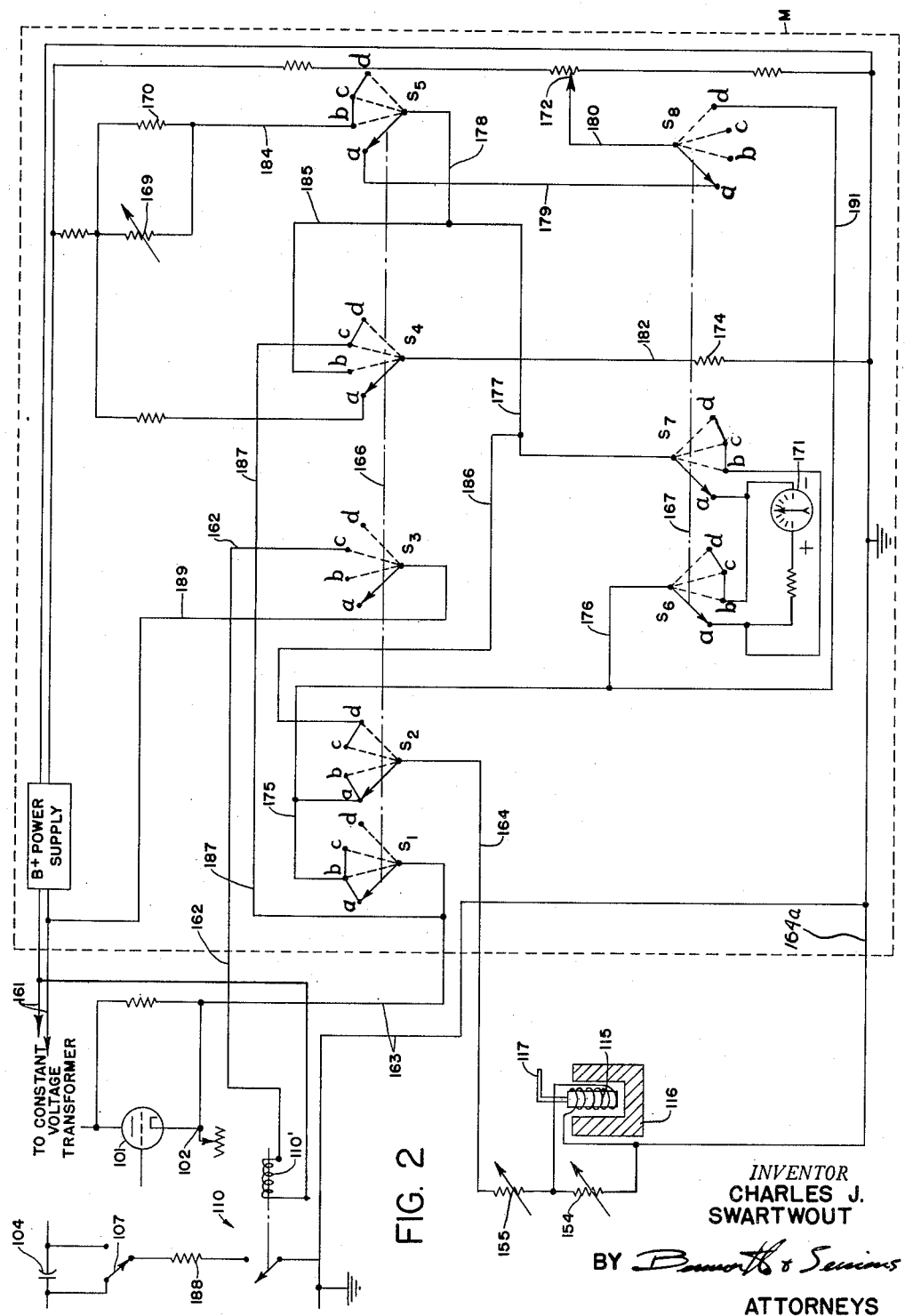

Figure 2 is a diagram showing a manual control system adapted for use in conjunction with the automatic control system of Figure 1.

The drawings are necessarily diagrammatic with respect to both electrical and mechanical components and no effort has been made to show the components in scale or in correct proportion to each other. In the following description and in the claims, the abbreviations "A.-C." and "D.-C." are used to designate "alternating current" and "direct current," respectively.

*General arrangement.*—As indicated diagrammatically in Figure 1, the system is adapted, for example, to control the level of liquid in a tank T by adjusting a valve V in conduit C leading to the tank. The sensing element for determining the level of liquid in the tank and for initiating the control operation includes a float 10 which operates a differential transformer indicated in general at 11. The output of the differential transformer is compared with a set point voltage from an adjustable differential transformer 12 and the difference in the two voltages amplified by the A.-C. amplifier indicated in general at 14. The A.-C. amplifier embodies a proportional band control network indicated generally at 15 and described in detail below. The output of the amplifier is rectified by a phase sensitive rectifier indicated in general at 16.

In order to provide an adjustable rate response or derivative amplifier, the D.-C. output of the rectifier 16 is applied to the rate amplifier circuit indicated in general at 17. Adjustable reset amplification, or integration, and power amplification is obtained through the reset network and power amplifier indicated in general at 18. The output of the reset amplifier is utilized to control the electro-pneumatic power relay indicated in general at 19 wherein the electrical signals resulting from changes in the level of liquid in the tank T are converted into changes in air pressure so that the air pressure can be employed to operate the valve V to maintain the desired level in the tank. The manual control, indicated in general at M in Figure 1 and shown in detail in Figure 2, may be interposed in the circuit between the reset amplifier and the power relay. Suitable switches in the manual control are utilized, as described below, to connect the manual control and disconnect the automatic control, and vice-versa.

In practice it is preferred to construct the components of the automatic control as a compact single unit that can be replaced simply by unplugging one unit and plugging in a new unit in case of failure. This also gives flexibility to the control and makes it possible to interchange, if desired, units having different combinations of modifying controls; for example, a control unit omitting the rate amplifier or the reset amplifier or both might be substituted for a complete control. All control adjustments are accurately calibrated to facilitate such interchange of units. The manual control is also constructed as a separate unit, so that either the manual control unit or the automatic control unit can be removed without disturbing the other. The entire control, including the automatic control unit and the manual control unit, can be located at any convenient central location along with the set point voltage transformer 12. Only the differential transformer 11 and the electro-pneumatic power relay 19 are required to be placed near the tank T and valve V respectively; these elements can be of sturdy construction and able to withstand poor operation conditions.

*Power supply.*—Electric power for the automatic control is supplied by transformer 21, the primary of which is preferably connected to the output of a conventional constant voltage transformer 20 that is energized from an ordinary A.-C. source; the secondaries of transformer 21 are used to supply the various voltages required by the circuit components. The B+ voltage is supplied by a full wave bridge rectifier indicated in general at 22, the rectifier being energized by secondary 23 and including a filter condenser 24.

*Input circuits.*—As noted above, the control operates upon the basis of a comparison between a voltage that varies with the variable to be controlled and an adjustable set point voltage. In the embodiment shown these voltages are derived from substantially identical differential transformers 11 and 12. It is to be understood that if it is desired to make the control responsive to more than one variable, a corresponding number of transformers 11, each actuated by an appropriate sensing element and with the outputs of the transformers combined, may be employed. Differential transformer 11 comprises a primary 25, secondaries 26 and 27 and a ferromagnetic armature 28 that is connected by a suitable mechanical connection 29 with the float 10 in tank T. The primary 25 is energized by the constant voltage transformer 20. The secondaries 26 and 27 are connected to buck each other with the result that when the armature 28 is in mid-position equal voltages are induced in secondaries 26 and 27 and the output of the transformer 11 is zero. As the armature is displaced in either direction from the mid-position the voltages induced in the secondaries are unbalanced; the unbalance is substantially linearly proportional to the displacement of the armature so that the output voltage varies with the displacement of the armature. Displacement of the armature in one direction from the mid-position results in voltages that are 180° out of phase with voltages induced when the armature is displaced in the opposite direction from mid-position; however, the apparatus preferably is arranged so that within the normal operating range the displacements of the armature are on the same side of the zero or mid-position.

In order to make it possible to adjust the output voltage calibration of the differential transformer 11, the primary supply circuit includes a variable resistor 32 and a condenser 33 which prevents the phase of the output voltage from shifting when the output voltage is adjusted by means of resistor 32. The circuit of the primary 25 also includes conventional fixed calibrating resistors 34 and 35 and a negative temperature coefficient resistor 36 in shunt with resistor 35. These resistors provide a temperature compensated circuit that can be adjusted to make the output of transformer 11 substantially independent of changes in ambient temperature within reasonable ranges.

In the preferred assembly of differential transformer 11, the negative temperature coefficient resistor 36 along with calibrating resistors 35 and 34 are mounted immediately adjacent the windings 25, 26 and 27 of the transformer so as to be subject to the same ambient temperature changes. These windings and resistors 34, 35 and 36 preferably are mounted in a housing or enclosure made of suitable magnetic material and indicated in general by dotted lines at E in the drawings. The housing E acts as a magnetic shield for the transformer windings and in addition insures that the negative temperature coefficient resistor 36 and the windings will be subject to the same ambient temperatures thereby enhancing the accuracy of the transformer.

The set point voltage is derived from transformer 12 which is substantially identical with transformer 11, the primary of the transformer also being energized from constant voltage transformer 20 through calibrating and temperature compensating circuits identical with those described in connection with transformer 11. In transformer 12, however, the armature 37 is manually adjustable to give the desired output by means of knob 38 which is supported for rotation but held against longitudinal movement in a panel 39. The threaded end 40 of the shank of the knob engages within a threaded aperture in nut 41 which is restrained against rotation and is operatively connected to armature 37. Thus, rotation of the knob 38 results in longitudinal movement of the armature 37 and adjustment of the output voltage of the transformer 12. In practice, the control knob may be calibrated accurately in terms of the variable to be controlled; i. e., the liquid level in tank T in the present example. While the set point voltage is shown as being manually adjustable, it is contemplated that the adjustments may be made automatically, for example, according to a predetermined time schedule; or the set point voltage may be controlled in response to changes in one or more other variables, thus making the control responsive to a relationship between a plurality of variables.

The signal and set point voltage outputs of transformers 11 and 12, respectively, are of the same phase and the same order of magnitude, both voltages leading the power supply voltage by approximately 58° in a preferred embodiment of the apparatus. The signal and set point voltages constitute the input voltages of the control circuits and are compared by applying them to the grid and cathode, respectively, of a triode 42. Because the effect of a signal applied to the cathode of a tube is greater than the effect of a signal applied to the grid, resistors 43 and 44 are used to attenuate slightly the set point voltage before it is fed to the cathode of the tube 42; the attenuation is such that the input gains of the tube for signals of equal strength fed into the cathode and grid circuits are equal. Hence, tube 42 becomes a true differential amplifier that is sensitive only to the difference between the signal input voltage and the set point input voltage and is independent of the actual levels of these signals. This difference then becomes the control signal voltage that is amplified and modified by the control circuits and utilized to operate the power relay 19. The output of the differential amplifier tube 42 is either in phase with the signal and set point input voltages or 180° out of phase therewith, depending upon whether the signal voltage exceeds or is less than the set point voltage. The magnitude of the output voltage depends on the amount of difference between the signal and set point voltages.

*A.-C. amplifier and proportional band control.*—The A.-C. amplifier, indicated in general at 14, is essentially a conventional three stage, resistance-capacitance coupled feed back amplifier, the tubes 47 and 48 furnishing stages of amplification in addition to the amplification of tube 42. Resistor 49 and condenser 50 are utilized to reduce the amount of A.-C. present in the voltages supplied to the plates of the amplifier tubes 42 and 47. Resistor 51 and condenser 52 provide decoupling between the first two amplifier stages. In order to eliminate high frequency components and oscillations in the amplifier, resistors 53 and 54 and condensers 55 and 56 are employed. Resistor 53 and condenser 55 also function to introduce a lagging phase shift in the signal voltage and thus compensate for the leading signal voltage output of the amplifier resulting from the 58° leading signal and set point inputs and bring the signal voltage into phase with the power supply.

To summarize, the signal input, which varies with the level of the liquid in the tank T, and the set point input are compared in the A.-C. amplifier and the difference between the signal and set point inputs are amplified. If there is no difference between the signal input and the set point input then the control signal is zero and the output of the amplifier is also zero. Depending upon whether the signal input voltage is greater than or less than the set point input voltage the amplifier delivers an output voltage that is in phase with or 180° out of phase with the power supply, the amplified control signal voltage being proportional to the difference between the signal input voltage and the set point input voltage.

The action of the A.-C. amplifier is modified by the proportional band control, which is, in effect, a sensitivity control that determines the amount of the response of the controlled element to given changes in the variable being controlled; i. e., in the present instance, the change in the position of the valve V in terms of percentage of its full travel that takes place in response to a given change in the level in the tank T in terms of percentage of the full scale movement of the differential transformer 11. This is defined as the percentage of the full range of the input signal that is required to produce full travel of the valve. At 100% proportional band the valve is moved through its entire range of movement in response to a change in the level of the tank equivalent to the full range of the level measuring element. At 5% proportional band only a 5% change in the level of the tank produces a full stroke of the valve. Thus low percentage of proportional band means high sensitivity, high percentage means low sensitivity. In the present system proportional band control is obtained through the network 15 which comprises a negative feed back circuit leading from the output of the A.-C. amplifier at point 57 and to the input of the amplifier through condenser 58, adjustable resistor 59 and resistor 61. Resistor 59 is accurately calibrated so that its adjustment can be readily determined to facilitate interchange of controller when desired or necessary. Adjustment of the resistor 59 governs the amount of negative feed back and in a preferred embodiment of the system makes possible control of the proportional band from 3% to 200%. Also, the condenser 58 and resistor 59 constitute a phase shift network that advances the phase of the feed back signal approximately 58° to match the input voltages derived from transformers 11 and 12.

By this means adjustable proportional band control is introduced into the system simply and with a minimum of components. The use of negative feed back to accomplish this insures stable operation of the amplifier.

*Phase-sensitive rectifier.*—The phase-sensitive rectifier takes the A.-C. control signal output of the A.-C. amplifier 14 and converts it into a D.-C. control signal voltage that is proportional to the A.-C. control signal voltage, the D.-C. voltage being positive when the A.-C. output of the A.-C. amplifier is in phase with the power supply and negative when this output is 180° out of phase with the power supply. Thus the phase sensitive rectifier produces a D.-C. control signal voltage that is proportional to the difference between the input signal voltage and the set point voltage and hence is proportional to the level in the tank T as compared to the desired level.

This is accomplished preferably by the circuits shown in which a reference voltage derived from secondary 62 of the transformer 21 is supplied through resistor 63 and condenser 64 to the center point between rectifiers 65 and 66. Condenser 64, rectifier 65, resistors 68 and 69 constitute a shunt rectifier circuit which produces a D.-C. voltage of the polarity indicated between the point 71 and ground. By increasing the resistance of variable resistor 68, the effectiveness of rectifier 65 can be reduced which makes it possible to adjust the value of the voltage between point 71 and ground by means of variable resistor 68.

Condensers 72 and 64, rectifier 66 and resistor 73 also constitute a rectifier circuit. Assuming first that there is no output at the terminal 57 of the A.-C. amplifier, then the reference voltage will produce a voltage between points 70 and 71 and across resistor 73 of the polarity indicated. Next, resistor 68 is adjusted to make the voltage across resistor 69 and the voltage across resistor 73 equal with no output from the A.-C. amplifier, so that these voltages balance and there is no voltage between point 70 and ground. With the circuit so adjusted, the application of an input signal in phase with the reference voltage will reduce the effective A.-C. applied to the rectifier circuit involving rectifier 66 causing the voltage across resistor 73 to be lower, while if the A.-C. is out of phase with the reference voltage the voltage across resistor 73 will be increased. The amount of the reduction or increase depends upon the amplitude of the applied A.-C. voltage. Inasmuch as the reference voltage is applied to both rectifier networks, the outputs of which are balanced against each other, while the signal voltage is applied to only one network, variations in the reference voltage amplitude within reasonably wide limits are ineffective to change the output whereas variations in signal voltage input result in substantially linear variations in output. The reference voltage must be greater than the maximum signal voltage, and in practice the reference voltage is normally three to four times the maximum signal voltage in amplitude. Resistor 74 and condenser 75 are added to the circuit to filter out A.-C. ripple from the output of the rectifier.

The response of the control can be reversed, that is, the output can be made to vary directly or inversely with the signal input voltage by merely reversing the connections to transformer secondary 62 and thus reversing the phase of the reference voltage supplied to the rectifier.

The rectifier produces a D.-C. control signal voltage that is proportional to the difference between the signal input voltage and the set point input voltage applied to the A.-C. amplifier; this D.-C. voltage after amplification by the rate amplifier and the reset circuit and power amplifier is utilized to effect the automatic control of the valve V.

*Rate amplifier.*—The D.-C. control signal output of the phase sensitive rectifier, which is proportional to the difference between the signal input and the set point input, is fed to the D.-C. rate amplifier indicated in general at 17. Essentially this comprises a D.-C. amplifier with a gain of, for example, about 50 and with a negative feed back circuit arranged with a time delay network. The feed back reduces the normally high amplification of the amplifier to substantially unity for the steady state; the time delay network reduces feed back for rapid changes. When no rate action is employed, the output of the amplifier is substantially equal to the input regardless of rate of change. When rate action is employed, a sudden change in control voltage input to the rate amplifier results in high amplification initially because there is the feed back delay. However, after a time interval determined by the adjustment of a resistor-capacitor network, the feed back again makes the output substantially equal to the input. The D.-C. output of the rate amplifier thus is not only proportional to the deviation between the input signal voltage and the set point voltage but also to the rate of change of the input signal with respect to the set point voltage. Hence, the effect of the rate amplifier is to make the controller sensitive to rapid changes in liquid level in tank T and provide corrective control in proportion to the rate of change of level.

Preferably, these results are accomplished by feeding the output of the phase sensitive rectifier to the grid of tube 77 through resistor 78, capacitor 79 being employed to filter out high frequency components. The negative feed back circuit includes fixed resistors 81 and 82, variable resistor 84 and condenser 85. In order to give the required time delay and accuracy, condenser 85 should be a high quality, low leakage condenser of substantial capacity, for example, in one embodiment a six microfarad condenser has been employed at this point. Resistor 84 preferably is a step-type resistor as shown and is accurately calibrated to permit convenient interchange of control units as described heretofore.

With this arrangement condenser 85 together with resistor 81 and that portion of the variable resistor 84 between resistor 81 and the adjustable contact 86, constitute a time delay network in the feed back circuit, the condenser shunting out the high frequency components and reducing the negative feed back to the grid for comparatively rapid changes in input to tube 77. It will be noted that adjustment of the resistor 84 does not change the total resistance in the grid circuit in any way but simply changes the amount of resistance that is in series with condenser 85. Thus for steady state conditions the feed back is the same regardless of the point of adjustment of the resistor 84.

When it is desired to eliminate completely the rate effect, the adjustable contact 86 is moved out of contact with resistor 84 and to a position where the condenser 85 is in series with resistor 83 and disconnected from resistor 84. This circuit simple places a charge on condenser 85 so that when the rate action is turned on again there will be no undesired fluctuations of the control.

In order to lower the plate voltage to a value suitable for feeding back to the grid of the tube, a floating power supply unit comprising rectifiers 87 and 88, capacitors 89, 90 and 91 and resistors 92, 93 and 94 is interposed in the feed back circuit. This unit receives its power from secondary 95 of the power transformer 21 and constitutes a more or less conventional voltage doubler circuit. The values of grid resistors 78 and 83 are very high compared to the value of plate resistor 96 with the result that there is no appreciable current flow in the grid circuit and through the floating power supply.

The rate amplifier can be adjusted from a condition in which the rate action is completely eliminated to a condition in which a signal impressed on the system as a result of a sudden change may be greatly amplified to give prompt and effective response to a quick change and normal response to slower changes in input.

*Reset circuit and power amplifier.*—The reset circuit and power amplifier gives an output proportional to the input and the time integral of the input. By means of this part of the controller, a very small input signal, if it persists for a sufficient period of time, can be made to give the maximum output signal that is obtainable with the system. This action enables the controller to compensate for wide changes in load conditions without sustained deviations of the controlled variable from the set point.

In the embodiment shown, the power amplifier includes a voltage amplifier tube 100 that furnishes amplified voltages in proportion to the deviation of the input voltage from the set point voltage and a cathode follower power amplifier tube 101. A signal impressed on the cathode of tube 100 is amplified thereby and appears at point 102, the output of the follower tube 101. By combining a negative feed back circuit with a positive feed back circuit, the overall gain of these amplifiers is caused to be very small, practically unity, for rapid changes of signal input, while the gain is caused to become very large, of the order of 200 or more to 1 for steady or very slow changing signal inputs. The negative feed back circuit connects to point 102, which is the output terminal of the reset circuit and the entire controller unit, continues through the floating power supply indicated in general at 103, and connects to the grid of tube 100 through a variable resistor-capacitance network comprising condenser 104 and variable resistor 105. The latter network provides an adjustable time constant in the negative feed back circuit through variation of the effective resistance of accurately calibrated variable resistor 105 and hence provides the adjustable reset function. The floating power supply 103 is in all essential respects similar to the floating power supply used in the rate amplifier and is energized from the secondary 106 of the power transformer 21. It is inserted into the circuit for dropping the output voltage down to a value suitable for feeding into the grid of tube 100. Switch 107 when in the position shown shorts out condenser 104, provides D.-C. negative feed back to tube 100 and reduces the gain to unity and thus eliminates the function of the reset network. With switch 107 open, D.-C. feed back is blocked by condenser 104 and negative feed back occurs only for rapidly changing signals.

The positive feed back circuit also connects to point 102 on the cathode of follower tube 101, passes through power supply 103, and then connects to the cathode of tube 100 through positive feed back resistors 108, 109. This is regenerative feed back and has the effect of greatly increasing the gain of the amplifier for even very small input signals, hence the gain of the amplifier in effect approaches infinity for steady-state D.-C. input, which is a desirable condition for a reset circuit.

With this arrangement of positive and negative feed back circuits and a time delay network in the latter circuit, the amplifier has a very high gain for D.-C. or slowly changing input signals because D.-C. negative feed back is blocked by condenser 104, and the amplifier reacts solely to positive feed back. However, when the input signals change rapidly in value and have high frequencies, the gain of the amplifier approaches unity by reason of negative feed back. By adjusting the value of resistor 105 from minimum to maximum, the reset rate in a preferred embodiment is adjustable from a maximum of 20 repeats per minute to a minimum of .03 repeat per minute.

The switch 107 is used to shunt out condenser 104 when it is desired to eliminate reset action. Relay 110 when energized shunts resistor 105 when reset switch 107 is closed and is utilized, as appears more fully below, to provide fast reset action when the manual control unit is in the Manual-Balance position with the result that there is no substantial fluctuation in the controlled variable when the control is switched from manual to automatic operation.

With this arrangement the power amplifier provides the power required for operating the controlled instrumentality such as the power relay 19 and the reset action gives full travel to the valve V in a predetermined period of time regardless of how small the deviation of the input voltage from the set point voltage may be.

While the A.-C. amplifier 14, rate amplifier 17 and power amplifier of the reset circuit 18 are described above as having a total of six vacuum tubes, it will be understood the elements of these tubes may be combined in pairs in the same glass envelopes so that the physical number of the tubes in the controller may be reduced to three, that is, three duo-triodes.

*Electro-pneumatic relay.*—As stated above the output of the automatic control unit is a D.-C. voltage having a magnitude that is a function of the deviation or error in liquid level in tank T as measured by the float 10. This D.-C. output is used to control the action of valve V in a manner to correct the deviation or error. In order to convert the electrical energy of the output of the control unit into a force capable of accurately positioning the valve V, the electro-pneumatic power relay 19 illustrated schematically in Figure 1 is provided.

The electrical components of the relay 19 comprise a moving coil 115 disposed in the field of a permanent magnet 116 and mechanically connected to a lever arm 117 adapted to pivot about fulcrum 118. Fulcrum 118 preferably is a spring pivot to eliminate friction and backlash. When the relay 19 is automatically controlled by the automatic control unit described above, coil 115 is energized by the output of the automatic control unit and is connected thereto by means of leads 119, the manual control unit M and leads 163. The force which coil 115 exerts on lever arm 117 as determined by the output control voltage of the control system is normally balanced by a force exerted by the pneumatic pilot valve assembly indicated in general at 120. When a change in the output of the controller occurs, the force exerted by coil 115 on lever 117 increases or decreases thereby momentarily upsetting the balance of forces acting on opposite ends of the lever. As a result of this unbalance, the lever 117 pivots slightly about fulcrum 118 thereby causing the end 121 of the lever to move up or down which initiates a change in air pressure in the assembly and restores the the balance of forces. Variations in voltage result in changes in or unbalancing of the forces exerted by the pilot diaphragm 125 and coil 115.

The action of pilot valve assembly 120 controls the supply of fluid, that is, air, under pressure to a conventional pneumatically operated diaphragm actuated regulating valve V in accordance with movement of lever arm 117 and comprises a housing 123 having an upper chamber 124 closed at the top by a diaphragm 125. A hollow sleeve 126 is secured to and movable with diaphragm 125 and is also connected to and movable with the end 121 of the lever arm 117. The lower end of sleeve 126 constitutes a valve seat which is normally engaged and closed by valve head 127.

Air under pressure is carried by conduit 129 to chamber 130 within the housing 123. Communication between chambers 130 and 124 is made through port 131 which is normally closed by valve head 132 connected by valve stem 133 to the upper valve head 127. Downward movement of diaphragm 125 causes valve head 127, stem 133 and valve head 132 to move downwardly correspondingly. The pressure of air in the chamber 130 acting against the bottom of valve head 132 urges both valves 132 and 127 upwardly to a normally closed position.

Upper chamber 124 of the housing 123 communicates via passageway 135 and conduit 136 to the underside of flexible diaphragm 137 secured to and located in the lower part of the housing 123. Thus, the unit pressure on the undersides of diaphragms 137 and 125 are substantially equal. The effective area of diaphragm 137 preferably is substantially greater than the area of diaphragm 125 and hence the force exerted on the former is proportionately greater than that exerted on the latter for a given pressure on the diaphragms. Another flexible diaphragm 138 is secured to the lower part of the housing in vertically spaced relation to diaphragm 137 and defines the bottom of another pressure chamber 139 in the housing.

The diaphragm 138 has a hollow sleeve 140 which has a larger diameter than sleeve 126 on diaphragm 125 and which is connected by member 141 to and is movable with lower diaphragm 137. Valve head 142 seats on the top of and normally closes sleeve 140 and is connected by stem 143 to valve head 144 which seats on and normally closes port 145 between chamber 139 and supply air chamber 130. The area of the opening of part 145 preferably is substantially greater than the area of the opening of port 131 and hence the air handling capacity of the former is correspondingly greater than that of the latter. The space 146 between diaphragms 137 and 138 is connected to atmosphere by conduit 147. Chamber 139 is connected by conduit 148 to a conventional diaphragm actuated regulating valve V, the pressure of air against the diaphragm being balanced by a spring 149 that in the embodiment shown in the drawing always tends to open the valve V.

The housing 123 preferably is constructed in two parts or sections secured together along the dot-dash line Z which passes through the central section of the housing. This construction permits convenient access to the valves 132 and 144 for inspection, cleaning and/or replacement when desired or necessary.

The operation of the electro-pneumatic relay is as follows: Assume that the output of the automatic control unit, for example, calls for a decrease in supply of liquid to the tank T. The output current from the automatic control unit for such a condition causes relay coil 115 to move upwardly as viewed which in turn causes lever 117 to pivot clockwise about its fulcrum 118 and the opposite end 121 of the lever to move downwardly. This movement of lever arm 117 presses diaphragm 125 downwardly and causes valve head 132 to open admitting air under pressure to chamber 124 until the pressure in chamber 124 builds up sufficiently to cause diaphragm 125 to exert an equalizing force against lever arm 117 at which time a state of equilibrium is reached with the force exerted by the diaphragm 125 balancing the force exerted by coil 115 and valve head 132 closes port 131.

The air pressure in upper chamber 124 is communicated to the underside of diaphragm 137 by passageway 135 and conduit 136 so that diaphragm 137 moves upwardly in response to the increase in pressure. This motion of diaphragm 137 is transmitted by member 141 to diaphragm 138, stem 143 and valve head 144, the latter thereby opening sufficiently to admit supply air under pressure through port 145 to chamber 139. When the air pressure in chamber 139 reaches a value such that the force on diaphragm 138 will be equal and opposite to force on diaphragm 137, a state of equilibrium is reached and valve head 144 closes. The increase in air pressure in chamber 139 is transmitted by conduit 148 to the diaphragm of valve V which causes the valve to close and reduce the flow of water to the tank.

When the opposite condition is sensed by the primary measuring element, that is, when the water level in the tank decreases, the D. C. output of the automatic control unit is reduced, the coil 115 exerts less force than the force exerted by diaphragm 125 and a condition of unbalance exists whereby lever 117 pivots in a counterclockwise direction about fulcrum 118 and the end 121 of lever 117, diaphragm 125 and sleeve 121 move upwardly. This movement of sleeve 126 unseats valve head 127 from the bottom of the sleeve and permits the air under pressure in chamber 124 to exhaust through the sleeve to atmosphere, decreasing the pressure in chamber 124 and on the underside of diaphragm 137 which unbalances the opposed forces exerted by the diaphragms 137 and 138. That is to say, diaphragm 137 will exert a lesser force by reason of the pressure decrease than the force exerted by diaphragm 138. As a result, these diaphragms move downwardly, the downward movement of diaphragm 138 causing unseating of valve head 142 from sleeve 140 and permitting chamber 139 to exhaust to atmosphere through conduit 147. This exhausting of chamber 139 reduces the pressure of air therein which in turn reduces the pressure acting on the diaphragm of valve V and permits valve spring 149 to open the valve a greater amount and increase the flow of water to the tank T.

The action of the electro-pneumatic relay 19 may be made to correspond either directly or inversely to the output of the automatic controller by reversing the connection of the leads to the moving coil 115. That is, with the leads connected to the coil 115 for direct action of the relay, air pressure to the regulating valve V increases or decreases directly as the controller output increases or decreases, and with the leads connected for reverse action, the air pressure increases with a voltage decrease and decreases with a voltage increase from the controller. Provision of direct-reverse action in the power relay together with the direct-reverse action obtainable through connection of the reference voltage leads to the phase sensitive rectifier, permits the whole control system to be made fail-safe regardless of the type of regulating valve employed.

Zero adjustment of the relay 19, that is, adjustment of the control air pressure in the pilot valve assembly to a desired value for a given output of the controller, preferably is accomplished by means of spring 151 attached at one end to lever 117 as shown and whose tension or compression is adjustable by means of a nut and bolt assembly 152 which secures the other end of the spring to an anchor 153. The effect of spring 151 is to increase or decrease the force exerted by the coil 115 on the lever. The total force exerted by the coil and spring is adjustable by means of the nut and bolt assembly 152 and hence the control pressure in pilot valve assembly 120 and consequently the degree of opening of valve V is adjustable to a desired value for a given output voltage of the controller.

Adjustment of the range or span of opening of the valve V for a given range of output of the controller is accomplished by means of variable resistor 154 which shunts across relay coil 115 and permits manual variation of the percentage of control output current passing through the coil. For example, assume the range of variation of output current of the controller is 4 milliamperes and for such a variation of current passing through coil 115 the range of opening of valve V is maximum or 100% of its full travel. With resistor 154 adjusted so that half the controller output current passes through the coil 115, that is, the current variation of flowing through coil 115 is 2 milliamperes, the range of opening of valve V is reduced to 50% for the full range of controller output. An additional variable resistor 155 is connected in series with coil 115 and resistor 154 in order to maintain a constant resistance load on the controller regardless of the setting of shunt resistor 154 and thus to maintain the impedance of the circuit at the desired level.

The relay 19 is a force balance mechanism, that is, a force proportional to the output voltage of the automatic control unit is balanced against an air pressure so that the air pressure supplied to the regulating valve V bears a proportional linear relationship to the output voltage from the control unit. The two stage diaphragm arrangement of the relay has the advantage of increasing the air handling capacity of the device without decreasing its sensitivity to relatively small signals from the automatic control unit. That is to say, the area of diaphragm 125 should be relatively small so that the balancing forces which the diaphragm exerts will be substantially in the same order of magnitude as the forces exerted by relay coil 115. Valves 127 and 132 preferably are relatively small in size so that the forces which these valves exert on lever arm 117 are negligible compared to the forces exerted by diaphragm 125. However, the correspondingly small openings in sleeve 126 and port 131 on which valves 127 and 132, respectively, seat, are capable of controlling or handling only small quantities of air. In order that the power relay will be capable of quickly actuating, for example, a relatively large regulating valve V, a second or booster stage is provided in the relay, which booster stage includes a supply port 145 and an exhaust sleeve 140, each having relatively large openings compared to port 131 and sleeve 126 and thus having substantially larger air handling capacities for properly actuating valve V. The capacity of the pilot valve assembly 120 may also be increased by providing a diaphragm 138 having an effective area smaller than that of diaphragm 137 so that a correspondingly greater control pressure in chamber 139 is required to effect a balance of forces exerted by diaphragms 137 and 138. In addition, the pilot valve assembly is completely enclosed thereby protecting the working parts from dirt and other foreign matter and insuring trouble free service.

The power relay is described and claimed in the copending application of Charles J. Swartwout and Earl O. Schweitzer entitled Power Relay, Serial No. 308,826, filed September 6, 1952.

*Manual control unit.*—The purpose of the manual control unit is to provide for manual operation of the control valve from a station remote from the valve together with means for indicating the operating position of the valve and means for switching the system from automatic to manual operation and vice versa. The manual control unit accomplishes this purpose by disconnecting the coil 115 of the electro-pneumatic power relay 19 from the output circuit of the automatic control unit and connecting the coil to a manually variable D.-C. voltage. Thus the switch over between automatic and manual operation is accomplished in the electrical part of the system, the pneumatic operation of pilot valve 120 and regulating valve V remaining unchanged.

The schematic diagram for the manual control unit is shown in Figure 2, more particularly the right hand portion of Figure 2 enclosed in the dotted line outline generally indicated at M. The manual control unit M is connected by lines 161 to the output of constant voltage transformer 20 which feeds the B+ power supply and is electrically connected to the automatic control unit by three lines, that is, line 162 which connects to the coil of reset relay 110, and lines 163 which connect to the D.-C. signal output of the automatic control unit. In addition, lines 164 and 164a connect the manual control unit M to the coil 115 of the electro-pneumatic relay 19.

The switching mechanism of the unit M consists of a manually operated gang selector switch, which for purposes of explanation is shown schematically in Figure 2 as eight multi-pole switches $S_1$ to $S_8$, inclusive. The movable contacts, shown as arrows, of the switches are connected or ganged together as indicated by the broken lines 166 and 167 and hence all switches operate simultaneously as they are moved from one position to the other. The selector switch has four operating positions, viz., Automatic, Automatic-balance, Manual-balance and Manual, which correspond to the positions of the movable contacts of switches $S_1$-$S_8$, inclusive, when in engagement with stationary contacts $a$, $b$, $c$ and $d$, respectively, of these switches. The function of these eight switches is explained in the description of the operation of the manual control unit which follows.

The variable resistor 169 along with resistor 170 furnishes a variable voltage which, when the unit is in the manual position, is impressed across the coil 115 of the power relay for actuation of the regulating valve V. A zero-center microammeter 171 is provided to indicate, among other things, a state of balance or amount of unbalance between the outputs of the automatic control unit and the adjustable resistor 169 to facilitate change over between the manual and automatic positions as is explained below. Potentiometer 172 provides an adjustable reference voltage to the side of the meter 171 opposite the side to which relay coil 115 is connected when the main selector switch is in either the automatic or manual positions. This reference voltage furnishes a basis with which to compare the variation of voltage across and hence current flowing through relay coil 115, the variation being indicated by deflection of the needle of the meter 171 away from "zero" or the null point, which deflection also indicates the functioning of valve V.

As mentioned above, manual electrical control of the valve V is accomplished by switching the relay coil 115 out of the output circuit of the automatic control unit and into the circuit of the manual control unit. In order to compensate for the removal of the resistance of the relay coil 115 from the output circuit of the automatic control unit, a "dummy load" resistor 174 having a resistance equal to the resistance of the relay coil load including resistors 154 and 155 as well as coil 115, preferably is substituted for the relay coil load in the output circuit of the automatic control unit and hence the resistance in or load on this output circuit remains unchanged for all positions of the selector switch. In the description which follows concerning the substitution of the "dummy load" resistor 174 for relay coil 115 in the output circuit of the controller, reference to the resistance of relay coil 115 is intended to include the total resistance in the controller output circuit, that is, the resistance of resistors 154 and 155 as well as the resistance of coil 115. By substituting resistor 174 for relay coil 115, the introduction of undesirable transients in and unbalancing of the automatic control unit circuits are avoided.

The operation of the manual control unit is as follows: The positions of the movable contacts of the switches S1–S8, inclusive, as shown in solid lines the drawings, that is, position $a$, represent the Automatic position for the main selector switch. In this position, output current from the automatic control unit passes through one of the lines 163 to contact $a$ of switch S1, through line 175 to contact $a$ of switch S2 through line 164 and finally through relay coil 115. This output current also passes from line 175 through line 176, through contact $a$ of switch S6 to the left side, as viewed, of meter 171. The other side of the meter is connected to the output of reference potentiometer 172 via contact $a$ of switch S7, lines 177 and 178 to contact $a$ of switch S5, through line 179, contact $a$ of switch S8 and finally through line 180 to potentiometer 172. Hence, the meter 171 compares the voltage drop across the power relay coil 115 with the reference voltage of potentiometer 172 and indicates the percentage of controller output which is effective to operate valve V. Resistor 174 is connected through line 182 and contact $a$ of switch S4 to the 300 volt D.-C. power supply and is not connected to the output of the automatic control unit. Thus with the selector switch in the automatic position the output circuit of the automatic control unit is operationally independent of the manual control unit, the only connection being made to meter 171 which serves as an indicator of the value of the control unit output.

When the selector switch S is thrown to the $b$ position, that is, the Automatic-balance position, the function of switches S1 and S2 is the same as for position $a$, the respective contacts $a$ and $b$ for these switches being connected together as shown. Thus the output of the controller still passes through the relay coil 115 as described above for the Automatic position of the selector switch.

The controller output is still connected to the meter 171 through lines 175 and 176, but, by reason of reversing switch S6, is impressed on the opposite or right as viewed side of the meter, that is, the negative side of the meter. The reason for reversing the connections to meter 171 is to cause the needle to deflect in the same direction from zero under the influence of the variable resistor 169 of the manual control unit as it did under the influence of the automatic controller. The positive, or left as viewed, side of the meter is connected to the output of manually actuated variable resistor 169, which output is also impressed across "dummy load" resistor 174. Tracing this latter connection, starting from the output side of variable resistor 169, line 184 connects variable resistor 169 to contact $b$ of switch S5, through line 178, up through line 185, through contact $b$ of switch S4, through line 182 and resistor 174 to ground. The current also passes from line 178, through line 177 and contact $b$ of reversing switch S7 to the positive or left side of meter 171. Since the resistances of relay coil 115 and resistor 174 are the same, meter 171 will indicate the difference, that is, the degree of unbalance between the output of the control unit and variable resistor 169. Note that the reference potentiometer 172 has been disconnected from the circuits by switch S8. In order to balance the output of these circuits, variable resistor 169 is adjusted manually until the meter 171 indicates balance with its needle centered on zero. When the condition of balance is thus reached and indicated, the selector switch is then thrown directly to the Manual position with the switches on contact $d$, the Automatic-balance position of the selector switch not being used when converting from automatic to manual operation.

The effect, inter alia, of switching the selector switch from the Automatic-balance position to the Manual position is to electrically interchange relay coil 115 and "dummy load" resistor 174, one for the other, in the circuits of the automatic and manual control units. Variable resistor 169 is electrically connected to relay coil 115 via line 184, contact $d$ of switch S5, lines 178, 177 and 186, through connected contacts $d$ and $c$ of switch S2, and line 164. Thus the current derived from the manually variable resistor 169 is the actuating current for coil 115, and the pilot valve 120 as well as regulating valve V are under the control of the manual control unit. The positive side of meter 171 is connected to the output of variable resistor 169 through connected contacts $b$, $c$ and $d$ of switch S7 which connect to the juncture of lines 177 and 186. The output of the control unit is disconnected from the negative or right side of meter 171 and reference potentiometer 172 is connected thereto in its place. The one of the lines 163 which connects to the automatic control unit output terminates at open contact $d$ of switch S1 and thus is disconnected from meter 171. Potentiometer 172, however, is reconnected to the meter through contact $d$ of switch S8, lines 191 and 176 and contact $d$ of switch S6. The meter now reads the difference between the manually set voltage drop across power relay coil 115 and the reference voltage. It will be noted that the loading effect on the output circuit of the automatic control unit is the same as though relay coil 115 were still in that circuit since the resistance of coil 115 and resistor 174 is the same.

The procedure of switching control of the power relay from manual to automatic operation is to throw the selector switch from the Manual position (contact $d$) to the Manual-balance position (contact $c$), effecting a balance across meter 171 between the outputs of the automatic control unit and the variable resistor 169 by adjusting the latter and then throwing the selector switch directly to the Automatic position. More praticularly, when the selector switch is thrown from the Manual position to the Manual-balance position with the switches on contact $c$, the effect is to disconnect reference potentiometer 172 from the negative side of meter 171 and in its place to connect to the meter the output of the automatic control unit as measured across "dummy load" resistor 174. The output of the automatic controller is connected to the negative side of meter 171 by the same circuits described above with reference to the Automatic-balance position, and is connected to resistor 174 by lines 187, contact $c$ of switch S4 and line 182. The positive side of meter 171 remains connected to the output of variable resistor 169 measured across relay coil 115. Thus meter 171 indicates the degree of unbalance between the outputs of the variable resistor 169 and the automatic control unit, which outputs may be balanced by adjustment of variable resistor 169. With this balance established the selector switch may be thrown directly to the Automatic position without introducing undesirable transients in the system.

Another result of shifting the selector switch from position $d$ to position $c$ is the energization of the coil 110' of reset relay 110 located in the reset circuit of the automatic control unit. The effect of closing this relay is more rapidly to drain off the charge of condenser 104 through resistance 188 to ground, and thus provide fast reset action regardless of the setting of adjustable reset resistor 105. This fast reset action is effected by the clossing of contact c of switch S₃ which closes the circuit between line 189 and one of the lines 161 connected to the transformer 20, and line 162 which connects to relay coil 110'. This is the only position in which switch S₃ is operative.

*Summary of operation.*—In placing the apparatus in condition for automatic operation, the connections to transformer secondary 62 and coil 115 are arranged so as to give the desired result in the controlled instrumentality for a change in the variable being controlled. In the present example these connections are arranged so that as the level of liquid in tank T falls the pressure of the air supplied to valve V is reduced thus permitting spring 148 to open the valve and supply more liquid to the tank to bring the level back to the set point. The opposite action takes place when the level rises.

Other preliminary adjustments include the adjustment of the tension of spring 151 to set the zero position of valve V, and the adjustment of resistor 154 to adjust the range of movement of valve V for a given change in the current flowing through the coil 115 of the power relay. Also, the set point transformer 12 may be calibrated in terms of the level of liquid in the tank T.

When power is supplied to the system it is only necessary to adjust the set point transformer 12 to the desired value and the control automatically operates the valve V to maintain the level in the tank T as near to the set point as possible. The level in the tank T is measured by the differential transformer 11. The outputs of differential transformers 11 and 12 are compared in tube 42 and the difference, if any, amplified by the A.-C. amplifier made up of tubes 42, 47 and 48. Proportional band control is provided by the adjustable resistor 59 which controls the negative feed back to the grid of tube 42. The width of proportional band selected depends upon the nature of the variable being controlled.

The output signal of the A.-C. amplifier, which is a function of the difference between the signal and set point input voltages as modified by the proportional band control, is rectified by the phase-sensitive rectifier. Inasmuch as the rectifier involves the comparison of the output signal with a reference voltage derived from the same A.-C. source, that is, the power supply for the entire system, changes in the voltage of the power supply within reasonable limits do no affect the output of the rectifier. The D.-C. signal output of the phase-sensitive rectifier is applied to the rate amplifier which embodies an adjustable negative feed back control that makes it possible to obtain a large amplification of the signal for rapid changes while there is substantially no amplification for steady-state or slowly changing signals. This gives stability of operation when that is required and rapid response when changes in the level of the tank T demand rapid changes in the valve V in order to prevent wide departure of the level in the tank from the set point.

The signal voltage, as modified by the rate amplifier, is next supplied to the power amplifier and reset network. In this section of the control, the amplification is through a voltage amplifier 100 and the cathode follower 101 with positive and negative feed back from the cathode follower to the voltage amplifier. Condenser 104 in the negative feed back circuit eliminates D.-C. negative feed back while adjustable resistor 105 leading to ground provides, with condenser 104, an adjustable time constant in the negative feed back. These circuits give adjustable reset action or integration to the control so that the valve V can be moved to the limit of its travel in a period of time dependent upon the reset adjustment regardless of how small the signal input to the cathode of the voltage amplifier tube 100 may be. This makes it possible for the valve V to compensate for wide variations in the amounts of fluid required to maintain the level in tank T without requiring any substantial difference between the level in the tank and the set point. The negative feed back circuit provides stability of operation under changing conditions and makes the reset circuit responsive only to steady-state or slowly changing conditions.

The output of the power amplifier is supplied to the power relay or transducer 19 which accurately controls the pressure of air supplied to valve V in response to changes in the flow of current through the moving coil 115.

When it is desired to operate the control manually this may be accomplished simply by moving the switch S from the automatic position to the manual position through the several steps described above. The switching operation from automatic to manual automatically substitutes a resistor 174 for the power relay output circuit including the coil 115 so that the automatic control circuit functions the same whether the system is operating on automatic or manual control. The meter 171 makes it possible to balance the outputs of the manual and automatic control elements so that no violent fluctuations of the control take place when switching from automatic to manual control or vice-versa. Inasmuch as the manual control unit and the automatic control, although functionally related, are substantially independent of each other in so far as structure is concerned, it is possible to remove either control without disturbing the operation of the other so that either unit can be replaced or serviced while the other unit maintains the system in operation.

From the foregoing description it will be evident that the invention provides a continuously variable electrical control system whereby one or more variables may be utilized to control one or more instrumentalities. The control acts substantially instantaneously inasmuch as it does not require long pneumatic lines. All delicate components of the system can be placed in a central location away from the severe operating conditions frequently encountered where such control systems are needed. The control is compact and flexible and can be adapted to many uses and purposes inasmuch as it involves all of the factors required for rapid and accurate response and at the same time stable and reliable operation. The control involves no moving parts except at the sensing element and the power relay; hence there are no probems of friction, back lash and wear. The components may be standard electrical components of known reliability. Only three double triode tubes are required to carry out all of the control functions and other components are kept at a minimum, so that the apparatus is compact and can be constructed at reasonable cost.

Those skilled in the art will appreciate that various changes and modifications can be made in the preferred form of control system described in detail herein by way of example without departing from the spirit and teachings of the invention. The scope of the invention is defined in the appended claims.

I claim:

1. In a system for regulating an instrumentality in response to changes in a variable and embodying a sensing element to detect said changes, means controlled by said sensing element for supplying an alternating current signal input voltage that varies in response to said changes, means for supplying an alternating current set point input voltage of the same phase as said signal input voltage, means for comparing said voltages and amplifying the difference therebetween, said comparing and amplifying means producing an output that is either in phase with or 180° out of phase with the input signal depending on whether the signal input voltage exceeds or is less than the set point input voltage and which varies in magnitude with the difference between said voltages, and said comparing and amplifying means embodying adjustable negative feed back to provide adjustable proportional band control, a phase-sensitive rectifier for converting the output of said comparing and amplifying means into a direct current signal voltage that is functional of the difference between said input voltages, a rate amplifier receiving the output of said phase-sensitive rectifier, a reset circuit and power amplifier receiving the output of said rate amplifier, and means for converting the electrical signal output of the power amplifier into a force functional thereof.

2. In a system for regulating an instrumentality in response to changes in a variable and embodying a sensing element to detect said changes, relatively low impedance means controlled by said sensing element for supplying an alternating current signal input voltage that varies in response to said changes, means for supplying an alternating current set point input voltage of the same phase as said signal input voltage, relatively high impedance means for comparing said voltages, an alternating current amplifier for amplifying the difference between said voltages and producing an output that is either in phase with or 180° out of phase with the input signal depending on whether the signal input voltage exceeds or is less than the set point input voltage and which varies in magnitude with the difference between said voltages, an adjustable negative feed back circuit in said amplifier for providing adjustable proportional band control in said system, a phase-sensitive rectifier for converting the output of said amplifier into a direct current signal voltage that is functional of the difference between said input voltages, a rate amplifier comprising a direct current amplifier embodying an adjustable negative feed back circuit to provide increased amplification for rapid changes in impressed signal voltage, a reset circuit and power amplifier receiving the output of said rate amplifier, said reset circuit and power amplifier embodying negative feed back with an adjustable time constant circuit whereby the overall gain of the power amplifier is maintained relatively small for rapid changes of signal input and may be made relatively large for steady or slowing changing signal inputs, and a transducer for controlling said instrumentality, said transducer embodying a relatively high impedance coil energized by said power amplifier.

3. In a system for regulating an instrumentality in response to changes in a variable and embodying a sensing element to detect said changes, means controlled by said sensing element for supplying an alternating current signal input voltage that varies in response to said changes, a multi-stage alternating current amplifier for producing an amplified alternating current signal that is functional of said signal input voltage, an adjustable negative feed back circuit in said alternating current amplifier for providing adjustable proportional band control in said system comprising an electrical connection between the output plate and the input grid of said amplifier and a variable impedance in series with said connection, a phase-sensitive rectifier for converting the output of said alternating current amplifier into a direct current signal voltage, a rate amplifier to provide increased amplification for rapid changes in impressed signal voltage, and a reset circuit and power amplifier receiving the output of said rate amplifier, said reset circuit maintaining the overall gain of the power amplifier relatively small for rapid changes of signal input making said gain relatively large for steady or slowly changing signal inputs.

4. In a system for regulating an instrumentality in response to changes in a variable and embodying a sensing element to detect said changes, means controlled by said sensing element for supplying a signal input voltage that varies in response to said changes, means including a power amplifier for providing an output functional of said signal input voltage, a transducer for converting the electrical signal output of the power amplifier into a force functional thereof, manual control means for supplying a manually controllable signal voltage to said transducer and switch means for disconnecting said power amplifier from said transducer when said manual control means is connected thereto.

5. In a system for regulating an instrumentality in response to changes in a variable and embodying a sensing element to detect said changes, means controlled by said sensing element for supplying a signal input voltage that varies in response to said changes, means including a power amplifier for providing an output functional of said signal input voltage, a power relay for controlling said instrumentality, said power relay embodying a coil circuit energized by said power amplifier, manual control means for supplying a manually controllable signal voltage to said coil circuit, and switch means for disconnecting said coil circuit from said power amplifier and connecting an impedance of the same value as said coil circuit to said power amplifier when said manual control means is connected to said coil circuit.

6. In a system for regulating an instrumentality in response to changes in a variable and embodying a sensing element to detect said changes, means controlled by said sensing element for supplying a signal input voltage that varies in response to said changes, means including a power amplifier and reset network for providing an output functional of said signal input voltage, said power amplifier and reset network embodying a negative feed back circuit embodying a condenser to prevent direct current negative feed back and a variable resistor to provide an adjustable time constant circuit whereby the overall gain of the power amplifier is maintained relatively small for rapid changes of signal input and may be made relatively large for steady or slowing changing signal inputs, a relay adapted when energized to connect said condenser to ground and thus provide fast reset action, a transducer for controlling said instrumentality, said transducer embodying a coil energized by said power amplifier, manual control means for supplying a manually controllable signal voltage to said coil and switch means for disconnecting the circuit including said coil from said power amplifier and connecting said coil circuit to said manual control means, said switch means embodying means for energizing said relay to provide fast reset action during the operation of disconnecting said manual control means and reconnecting said power amplifier to said coil circuit and means for connecting an impedance of the same value as said coil circuit to said power amplifier when said power amplifier is disconnected from said coil circuit.

7. In a system for regulating an instrumentality in response to changes in a variable and embodying a sensing element to detect said changes, means controlled by said sensing element for supplying a signal input voltage that varies in response to said changes, means including a reset circuit and power amplifier for providing an output functional of said signal input voltage, said reset circuit and power amplifier embodying a negative feed back circuit embodying a condenser to prevent direct current negative feed back and a variable resistor to provide an adjustable time constant circuit whereby the overall gain of the power amplifier is maintained relatively small for rapid changes of signal input and may be made relatively large for steady or slowing changing signal inputs, a relay adapted when energized to connect said condenser to ground and thus provide fast reset action, a transducer for controlling said instrumentality, said transducer embodying a coil circuit energized by said power amplifier, manual control means for supplying a manually controllable signal voltage to said coil circuit and switch means for disconnecting said coil circuit from said power amplifier and connecting said coil circuit to said manual control means, said switch means embodying means for energizing said relay to provide fast reset action during the operation of disconnecting said manual control means and reconnecting said power amplifier to said coil.

8. In a system for regulating an instrumentality in response to changes in a variable and embodying a sensing element to detect said changes, relatively low impedance means controlled by said sensing element for supplying an alternating current signal input voltage that varies in response to said changes, means for supplying an alternating current set point input voltage of the same phase as said signal input voltage, relatively high impedance means for comparing said voltages, an alternating current amplifier for amplifying the difference between said voltages and producing an output that is either in phase with or 180° out of phase with the input signal depending on whether the signal input voltage exceeds or is less than the set point input voltage and which varies in magnitude with the difference between said voltages, an adjustable negative feed back circuit in said amplifier for providing adjustable proportional band control in said system, a phase-sensitive rectifier for converting the output of said amplifier into a direct current signal voltage that is functional of the difference between said input voltages, a rate amplifier comprising a direct current amplifier embodying an adjustable negative feed back circuit to provide increased amplification for rapid change in impressed signal voltage, a power amplifier and reset network receiving the output of said rate amplifier, said power amplifier and reset network embodying negative feed back with an adjustable time constant circuit whereby the overall gain of the power amplifier is maintained relatively small for rapid changes of signal input and may be made relatively large for steady or slowing changing signal inputs, a power relay for controlling said instrumentality, said power relay embodying a relatively high impedance coil circuit energized by said power amplifier, manual control means for supplying a manually controllable signal voltage to said coil circuit and switch means for disconnecting said coil circuit from said power amplifier and connecting an impedance of substantially the same value as said coil circuit to said power amplifier when said manual control means is connected to said coil circuit, said switch means also embodying means for setting said reset network for maximum reset rate during the operation of switching the connection for said coil from said manual control means to said power amplifier.

9. In a system for regulating an instrumentality in response to changes in a variable and embodying a sensing element to detect said changes, relatively low impedance means controlled by said sensing element for supplying an alternating current signal input voltage that varies in response to said changes, means for supplying an alternating current set point input voltage of the same phase as said signal input voltage, relatively high impedance means for comparing said voltages, an alternating current amplifier for amplifying the difference between said voltages and producing an output that is in phase or 180° out of phase with the input signal depending on whether the signal input voltage exceeds or is less than the set point input voltage and which varies in magnitude with the difference between said voltages, a phase-sensitive rectifier for connecting the output of said amplifier into a direct current signal voltage that is functional of the difference between said input voltages, a rate amplifier to provide increased amplification for rapid change in impressed signal voltage, a power amplifier receiving the output of said rate amplifier, a power relay for controlling said instrumentality, said power relay embodying a relatively high impedance coil circuit energized by said power amplifier, manual control means for supplying a manually controllable signal voltage to said coil circuit and switch means for disconnecting said coil circuit from said power amplifier, connecting said coil circuit to said manual control means and connecting an impedance of substantially the same value as said coil circuit to said power amplifier when said manual control means is connected to said coil circuit.

10. In a system of the type described, a first differential transformer for supplying an alternating current signal input voltage, said first differential transformer comprising a primary energized by an alternating current source, two secondaries connected so that their output voltages buck each other and a ferro-magnetic armature in the flux path linking said primary and said secondaries, means for moving said armature to change the flux paths linking said primary and said two secondaries relative to each other whereby the output of said transformer varies in accordance with the position of said armature, a second differential transformer substantially identical with said first differential transformer for providing an alternating current set point input voltage of the same phase as said signal input voltage, electronic means for comparing and amplifying said signal input and set point input voltages comprising an electronic valve means having a grid circuit and a cathode circuit, grid circuit means connecting the output of one of said transformers to the grid of said electronic valve means, cathode circuit means for attenuating the output of the other of said transformers and connecting the same to the cathode of said electronic valve means, the attenuation being such that the effects of equal signals impressed on said cathode and grid circuit means are substantially equal, an alternating current amplifier for amplifying the output of said electronic valve means, an adjustable negative feed back circuit leading from the output of said amplifier to the grid of said electronic valve means, the output of said amplifier reversing in phase and varying in amplitude with variations in said signal input voltage with respect to said set point input voltage, and a phase-sensitive rectifier for converting the output of said alternating current amplifier into a direct current voltage functional of the difference between said signal and set point input voltages.

11. In a system of the type described, a first differential transformer for supplying an alternating current signal input voltage, said first differential transformer comprising a primary energized by an alternating current source, two secondaries connected so that their output voltages buck each other and a ferro-magnetic armature in the flux path linking said primary and said secondaries, means for moving said armature to change the flux paths linking said primary and said two secondaries relative to each other whereby the output of said transformer varies in accordance with the position of said armature, a second differential transformer substantially identical with said first differential transformer for providing an alternating current set point input voltage of the same phase as said signal input voltage, electronic means for comparing and amplifying said signal input and set point input voltages comprising an electronic valve means including a grid circuit and a cathode circuit, grid circuit means connecting the output of one of said transformers to the grid of said electronic valve means, cathode circuit means for connecting the output of the other of said transformers to the cathode of said electronic valve means, an alternating current amplifier for amplifying the output of said electronic valve means, and an adjustable negative feed back circuit leading from the output of said amplifier to the grid of said electronic valve means for providing adjustable proportional band control in said system.

12. In a system of the type described, a differential transformer for supplying an alternating current signal input voltage, said differential transformer comprising a primary energized by an alternating current source, two secondaries connected so that their output voltages buck each other and a ferro-magnetic armature in the flux path linking said primary and said secondaries, means for moving said armature to change the flux paths linking said primary and said two secondaries relative to each other whereby the output of said transformer varies in accordance with the position of said armature, means for providing an alternating current set point input voltage of the same phase as said signal input voltage, and electronic means for comparing and amplifying said signal input and set point input voltages comprising an electronic valve means, grid circuit means connecting the output of said transformer to the grid of said electronic valve means, and cathode circuit means for connecting the output of the set point voltage means to the cathode of said electronic valve means.

13. In a system of the type described, a first differential transformer for supplying an alternating current signal input voltage of variable magnitude, a second differential transformer for providing a relatively fixed alternating current set point input voltage of the same phase as said signal input voltage, electronic means for comparing and amplifying said variable signal input and said fixed set point input voltages comprising an electronic valve means including a cathode and a grid, circuit means connecting the output of one of said transformers to the grid of said electronic valve means, circuit means connecting the output of the other of said transformers to the cathode of said electronic valve means, an alternating current amplifier for amplifying the output of said electronic valve means, and an adjustable negative feed back circuit leading from the output of said amplifier to the grid of said electronic valve means.

14. In a system of the type described, means for supplying an alternating current signal input voltage, means for supplying a relatively constant alternating current set point input voltage of the same phase as said signal input voltage, electronic means for comparing and amplifying said signal input and set point input voltages comprising a triode, grid circuit means connecting the output of one of said input voltage supply means to the grid of said triode, cathode circuit means for connecting the output of the other of said input voltage supply means to the cathode of said triode, means including said triode for amplifying the difference between said signal and set point input voltages, and an adjustable negative feed back connection between the output of said last named means and the grid of said triode for controlling the gain of said amplifying means.

15. In a system of the type described, a differential transformer comprising a primary, two secondaries and a ferromagnetic armature in the flux path linking said primary and said secondaries, a circuit for energizing said primary from an alternating current source, said cicuit including a variable resistor in series with said primary for adjusting the output of said transformer, and a condenser shunted across the input leads of said primary for permitting adjustment of the output of the transformer without a corresponding phase shift.

16. In a system of the type described, a first differential transformer for supplying an alternating current signal input voltage, said first differential transformer comprising a primary energized by an alternating current source, two secondaries connected so that their output voltages buck each other and a ferro-magnetic armature in the flux path linking said primary and said secondaries, means for moving said armature to change the flux paths linking said primary and said two secondaries relative to each other whereby the output of said transformer varies in accordance with the position of said armature, a second differential transformer substantially identical with said first differential transformer for providing an alternating current set point input voltage of the same phase as said signal input voltage, electronic means for comparing and amplifying said signal input and set point input voltages comprising a triode, grid circuit means connecting the output of one of said transformers to the grid of said triode, cathode circuit means for attenuating the output of the other of said transformers and connecting the same to the cathode of said triode, the attenuation being such that the effects of equal signals impressed on said cathode and grid circuit means are substantially equal, an alternating current amplifier for amplifying the output of said triode, an adjustable negative feed back circuit leading from the output of said amplifier to the grid of said triode, the output of said amplifier reversing in phase and varying in amplitude with variations in said signal input voltage with respect to said set point input voltage, and a phase-sensitive rectifier for converting the output of said amplifier into a direct current voltage functional of the difference between said signal and set point input voltages, said phase-sensitive rectifier comprising a source of alternating current reference voltage, an adjustable half-wave rectifier circuit adapted to produce a direct current voltage between said source and ground, a second half-wave rectifier circuit adapted to produce a direct current voltage of the same polarity between said source and the output circuit of said amplifier, said adjustable rectifier circuit being adjustable so that the voltage across said rectifier circuits between ground and said output circuit of the amplifier is zero when the alternating current signal output is zero, whereby an alternating current signal output in phase with the reference voltage produces a direct current voltage of one sign between said output circuit and ground and an alternating current signal out of phase with said reference voltage produces a direct current voltage of opposite sign between said output circuit and ground.

17. In a system of the type described, means for supplying an alternating current signal input voltage, means for supplying an alternating current set point input voltage of the same phase as said signal input voltage, means for comparing said signal input and set point input voltages and amplifying the difference between them, the output of said comparing and amplifying means varying in phase and amplitude with variations in said signal input voltage with respect to said set point input voltage, and a phase-sensitive rectifier for converting the output of said comparing and amplifying means into a direct current voltage functional of the difference between said signal and set point input voltages, said phase-sensitive rectifier comprising a source of alternating current reference voltage, two rectifier circuits energized by said source adapted to produce direct current voltages of the same polarity between a common center connection to said source and two outside connections, circuit means for connecting the output of said comparing and amplifying means to one of said outside connections, one of said rectifier circuits being adjustable so that the voltage across said outside connections is zero when the alternating current signal output from the comparing and amplifying means is zero, whereby an alternating current signal output in phase with the reference voltage produces a direct current voltage of one sign across said outside connections and an alternating current signal 180° out of phase with said reference voltage produces a direct current voltage of opposite sign across said outside connections.

18. In a system for regulating an instrumentality in response to changes in a variable and embodying a sensing element to detect said changes, means controlled by said sensing element for supplying an alternating current signal input voltage that varies in response to said changes, means for supplying an alternating current set point input voltage of the same phase as said signal input voltage, means for comparing said voltages and producing an output that is in phase or 180° out of phase with the input signal depending on whether the signal input voltage exceeds or is less than the set point input voltage and which varies in magnitude with the difference between said voltages, a phase-sensitive rectifier for converting the output of said comparing means into a direct current signal voltage that is functional of the difference between said input voltages, a rate amplifier receiving the output of said phase-sensitive rectifier and comprising an electronic amplifier embodying a negative feed back circuit from the output to the control electrode thereof, said negative feed back circuit including a floating power supply comprising a rectifier energized from an alternating current source for dropping the output voltage of said amplifier to a proper value to be fed into the control electrode thereof, a variable resistor having the entire resistance thereof connected in series in said negative feed back circuit, said resistor having an adjustable contact connected to ground through a condenser whereby said resistor and condenser provide an adjustable time delay network adapted adjustably to reduce negative feed back for comparatively rapid changes in signal input to said amplifier while the feed back for steady state conditions is substantially unaffected regardless of the adjustment of said adjustable contact, whereby greatly increased amplification of rapidly changing signals as compared to steady-state signals can be obtained, and means for regulating said instrumentality in response to changes in the output of said rate amplifier.

19. In a system for regulating an instrumentality in response to changes in a variable and embodying a sensing element to detect said changes, means for supplying a direct current voltage that is functional of said changes, a rate amplifier receiving the output of said means and comprising an electronic amplifier embodying a negative feed back circuit, said negative feed back circuit including a floating direct current power supply for dropping the output voltage of said amplifier to a proper value to be fed back thereto, a variable resistor having the entire resistance thereof connected in series with said negative feed back circuit, said resistor having an adjustable contact connected to ground through a condenser whereby said resistor and condenser provide an adjustable time delay network adapted adjustably to reduce negative feed back for comparatively rapid changes in signal input to said amplifier while the feed back for steady-state conditions is substantially unaffected regardless of the adjustment of said adjustable contact, whereby greatly increased amplification of rapidly changing signals as compared to steady-state signals can be obtained.

20. In a system for regulating an instrumentality in response to changes in a variable, means for supplying a voltage that is functional of said changes, a rate amplifier receiving the output of said means comprising an electronic amplifier embodying an adjustable negative feed back circuit, said negative feed back circuit including a floating power supply for dropping the output voltage of said amplifier to a proper value to be fed into the grid circuit of said amplifier and a variable resistor and a capacitor providing an adjustable time delay network adapted to adjustably reduce negative feed back for comparatively rapid changes in signal input to said amplifier while the feed back for steady-state conditions is substantially unaffected regardless of the adjustment of said resistor, whereby greatly increased amplification of rapidly changing signals as compared to steady-state signals can be obtained, and means for regulating said instrumentality in response to changes in said system.

21. In a system for regulating an instrumentality in response to changes in a variable, means for supplying a voltage that is functional of said changes, a rate amplifier receiving the output of said means and comprising an electronic amplifier embodying a negative feed back circuit from the output to the control electrode thereof, said negative feed back circuit including a variable resistor having the entire resistance thereof connected in series in said negative feed back circuit, said resistor also having an adjustable contact connected to ground through a condenser whereby said resistor and condenser provide an adjustable time delay network adapted adjustably to reduce negative feed back for comparatively rapid changes in signal input to said amplifier while the feed back for steady state conditions is substantially unaffected regardless of the adjustment of said adjustable contact, whereby greatly increased amplification of rapidly changing signals as compared to steady-state signals can be obtained.

22. In a system for regulating an instrumentality in response to changes in a variable and embodying a sensing element to detect said changes, means controlled by said sensing element for supplying an alternating current signal input voltage that varies in response to said changes, means for supplying an alternating current set point input voltage of the same phase as said signal input voltage, means for comparing said voltages, an alternating current amplifier for amplifying the difference between said voltages and producing an output that is in either phase with or 180° out of phase with the input signal depending on whether the signal input voltage exceeds or is less than the set point input voltage and which varies in magnitude with the difference between said voltages, an adjustable negative feed back circuit in said amplifier for providing adjustable proportional band control in said system, a phase-sensitive rectifier for converting the output of said alternating current amplifier into a direct current signal voltage that is functional of the difference between said input voltages, a rate amplifier comprising a direct current amplifier embodying an adjustable negative feed back circuit to provide increased amplification for rapid changes in impressed signal voltage, a reset circuit and power amplifier for providing an output functional of said changes comprising a voltage amplifier, circuit means for impressing the output of said rate amplifier on the cathode of said voltage amplifier, a cathode follower having its grid connected to the plate of said voltage amplifier, feed back circuits leading from the cathode of said cathode follower to the cathode and grid of said voltage amplifier to provide positive and negative feed back respectively, said feed back circuits including a floating power supply comprising a rectifier energized from an alternating current source for dropping the output voltage of said cathode follower to a proper value to be fed into said cathode and grid, said negative feed back circuit including a condenser for eliminating direct current negative feed back and a variable resistor leading to ground to provide with said condenser in adjustable time constant in the negative feed back circuit.

23. In a system for regulating an instrumentality in response to changes in a variable, means for providing a direct current signal voltage functional of said changes, a rate amplifier comprising a direct current amplifier embodying an adjustable negative feed back circuit to provide increased amplification for rapid changes in impressed signal voltage, a reset circuit and power amplifier for providing an output functional of said changes comprising a voltage amplifier, circuit means for impressing the output of said rate amplifier on the cathode of said voltage amplifier, a cathode follower having its grid connected to the plate of said voltage amplifier, feed back circuits leading from the cathode of said cathode follower to the cathode and grid of said voltage amplifier to provide positive and negative feed back respectively, said feed back circuits including a floating power supply comprising a rectifier energized from an alternating current source for dropping the output voltage of said cathode follower to a proper value to be fed into said cathode and grid, said negative feed back circuit including a condenser and a variable resistor leading to ground to eliminate direct current negative feed back and provide an adjustable time constant in the negative feed back circuit.

24. In a system for regulating an instrumentality in response to changes in a variable, means for providing a direct current signal voltage functional of said changes and a reset circuit and power amplifier for providing an output functional of said chages comprising a voltage amplifier, circuit means for impressing said signal voltage on the cathode of said voltage amplifier, a cathode follower having its grid connected to the plate of said voltage amplifier, a feed back circuit leading from the cathode of said cathode follower to the grid of said triode amplifier to provide negative feed back, said negative feed back circuit including a condenser and a variable resistor leading to ground to eliminate direct current negative feed back and provide an adjustable time constant in the negative feed back circuit.

25. In a system for regulating an instrumentality in response to changes in a variable and embodying a sensing element to detect said changes, means controlled by said sensing element for supplying a signal input voltage that varies in response to said changes, and means including a reset circuit and power amplifier for providing an output funcional of said changes comprising circuit means connecting the output of said power amplifier to the input thereof, one part of said circuit means providing regenerative feedback for said amplifier and the other part of said circuit means providing negative feed back for said amplifier, said other part of said circuit means including a condenser to prevent direct current negative feedback and a variable resistor across which said condenser is connected to provide an adjustable time constant circuit whereby the overall gain of the power amplifier is maintained relatively small for rapid changes of signal input and may be made relatively large for steady or slowing changing signal inputs.

26. In a system for regulating an instrumentality in response to changes in a variable and embodying a sensing element to detect said changes, means controlled by said sensing element for supplying an alternating current signal input voltage that varies in response to said changes, a rectifier for providing a direct current voltage functional of said changes, and means including a reset circuit and power amplifier for providing an output functional of said changes, said reset circuit connecting the output of said power amplifier to the input thereof for providing combined regenerative and negative feed back, one part of said circuit embodying a condenser to block direct current negative feed back potential and to pass rapidly changing negative feed back potentials whereby the overall gain of the power amplifier is maintained at substantially unity for rapid chances of signal input and may be made very large for steady or slowing changing signal inputs.

27. In a system for regulating an instrumentality in response to changes in a variable and embodying a sensing element to detect said changes, means controlled by said sensing element for supplying an alternating current signal input voltage that varies in response to said changes, means for supplying an alternating current set point input voltage, means for providing a direct current signal voltage that is functional of the difference between said input voltages, a rate amplifier comprising a direct current amplifier embodying an adjustable negative feed back circuit to provide increased amplification for rapid changes in impressed signal voltage, a power amplifier for providing an output functional of said changes comprising a triode, circuit means for impressing the output of said rate amplifier on the cathode of said triode, a cathode follower having its grid connected to the plate of said triode, and a transducer energized by said cathode follower for controlling said instrumentality.

28. In a system for regulating an instrumentality in response to changes in a variable, a transducer having a coil adapted to be energized, automatic control means for automatically controlling said transducer, and a manual control unit having manual control means for manually controlling said transducer and means for switching control of said transducer between said automatic control means and said manual control means, said manual control unit comprising a fixed resistor having a resistance equal to the resistance of said transducer coil circuit, a manually adjustable variable resistor connected to a source of power, a switch, a meter, a reference voltage, said switch in a first position connecting the output of said automatic control means across said coil and to one side of said meter and connecting said reference voltage to the other side of said meter, said switch in a second position disconnecting the reference voltage from said other side of said meter and connecting thereto the output of said variable resistor measured across said fixed resistor, thereby permitting the outputs of said automatic control means and said variable resistor as measured across said coil and said fixed resistor, respectively, to be compared by said meter and balanced by adjustment of said variable resistor, said switch in a third position interchanging the connections of said fixed resistor and said coil to said variable resistor and the output of the automatic control unit, respectively, whereby the fixed resistor is in circuit with the automatic control means and said coil is in circuit with said variable resistor, said switch in the third position also disconnecting the output of the automatic control means from and reconnecting the reference voltage to the meter thereby comparing the output of said variable resistor across said coil with said reference voltage.

29. In a system for regulating an instrumentality through a power relay having an electric coil circuit, an automatic control unit for automatically energizing said coil circuit and having a reset circuit embodying adjustable reset action and a normally inoperative "fast reset" relay, manual control means for manually energizing said coil circuit, switch means for switching the connection of said coil circuit between said automatic control unit and said manual control means, a resistor having a resistance equal to the resistance of said coil circuit, a meter, and a reference voltage, said switch means in a first position connecting the output of said automatic control unit to said coil circuit and one side of said meter and connecting said reference voltage to the other side of said meter, said switch means in a second position disconnecting the reference voltage from said other side of said meter and connecting thereto the output of said manual control means measured across said resistor, thereby permitting the outputs of said automatic control unit and said manual control means as measured across said relay coil and said resistor, respectively, to be compared by said meter and balanced by adjustment of said manual control means, said switch means in a third position interchanging the connections of said resistor and said coil to said manual control means and said automatic control unit, respectively, and connecting said "fast reset" relay to an energizing source to provide fast reset action, said switch means in a fourth position disconnecting the output of the automatic control unit from and reconnecting the reference voltage to the meter whereby the output of said manual control means across said coil is compared with said reference voltage.

30. In a system for regulating an instrumentality through a power relay having an impedance, an automatic control unit for automatically controlling said relay, manual control means for manually controlling said relay, switch means for switching the connection of said relay between said automatic control unit and said manual control means, impedance means having an impedance equal to the impedance of relay, a meter, and a reference voltage, said switch means in a first position connecting the output of said automatic control unit to said relay and one side of said meter and connecting said reference voltage to the other side of said meter, said switch means in a second position disconnecting the reference voltage from said other side of said meter and connecting thereto the output of said manual control means measured across said impedance means, thereby permitting the outputs of said automatic control unit and said manual control means as measured across said relay and said impedance means, respectively, to be compared by said meter and balanced by adjustment of said manual control means, said switch means in a third position interchanging the connections of said impedance means and said relay to said manual control means and said automatic control unit, respectively, and disconnecting the output of the automatic control unit from and reconnecting the reference voltage to the meter whereby the output of said manual control means across said coil is compared with said reference voltage.

31. In a system for regulating an instrumentality through a power relay, automatic control means having an output connectable to said relay, manual control means having an output connectable to said relay, a multipole switch for switching the connection of said relay between the outputs of said automatic control means and said manual control means, and a meter, said switch in a first position connecting the output of said automatic control means to said relay and said meter, said switch in a second position connecting the output of said manual control means to the side of said meter opposite said automatic control means thereby permitting the outputs of said automatic control means to be compared by said meter and balanced by adjustment of said manual control means, said switch in a third position disconnecting said relay from the output of said automatic control means and connecting said relay to the output of said manual control means and disconnecting the output of the automatic control means from said meter.

32. In a system for regulating an instrumentality by relay means having an impedance, automatic control means having an output connected to said relay means, manual control means having an output connected to said relay means, switch means for switching the connection of said relay means between the outputs of said automatic control means and said manual control means, indicator means for comparing the outputs of said automatic control means and said manual control means prior to the switch of said relay means from the output of one control means to the other, and impedance means having an impedance equal to the impedance of the relay means, said switch means also connecting said impedance means to the output of said automatic control means when said relay means is disconnected therefrom.

33. In a system for regulating an instrumentality in response to the change in a variable from a predetermined value and for restoring the variable to said predetermined value, a sensing element adapted to detect said change, means controlled by said sensing element for supplying an electrical signal input corresponding to the magnitude of said change detected by said sensing element, means for supplying a relatively constant electrical set point input, means for comparing said electrical inputs and producing an electrical signal output that is functional of the difference between said electrical inputs, a rate amplifier and a reset circuit and power amplifier arranged in series and receiving the output of said comparing means, and means for converting the electrical signal output of the power amplifier into a force functional thereof.

34. In a system of the type described, a phase sensitive rectifier for converting an alternating current signal voltage that varies in amplitude and phase into a direct current voltage whose amplitude is functional of the amplitude of said alternating current signal voltage and which is of one sign when said alternating current signal voltage is in phase with a reference voltage from an alternating current source and of the opposite sign when said alternating current signal voltage is 180° out of phase with said reference voltage, said source having two output terminals, one of which is connected to ground, said phase sensitive rectifier having a center point connection to the other terminal of said source and having two outer points, one of which is connected to ground, and comprising a first rectifier circuit adapted to produce a direct current voltage between ground and said center point, a second rectifier circuit adapted to produce a direct current voltage of same polarity between the other of said outer points and said center point, circuit means for connecting said alternating current signal voltage across the other of said outer points and ground, one of said rectifier circuits being adjustable so that the voltage across said other outer point relative and ground is zero when the alternating current signal is zero, whereby an alternating current signal in phase with the reference voltage produces a direct current voltage of one sign between said other of the outer points and ground, and an alternating current signal out of phase with said reference voltage produces a direct current voltage of opposite sign between said other of the outer points and ground.

35. In a system for regulating an instrumentality in response to the change in a variable from a predetermined value and for restoring the variable to said predetermined value, a sensing element adapted to detect said change, means controlled by said sensing element for supplying an alternating current signal input voltage corresponding to the magnitude of said change detected by said sensing element, means for supplying an alternating current set point input voltage of the same phase as said signal input voltage, means for comparing said voltages and producing an output that is either in phase with or 180° out of phase with the input signal depending on whether the signal input voltage exceeds or is less than the set point input voltage and which varies in magnitude with the difference between said voltages, a phase-sensitive rectifier for converting the output of said comparing means into a direct current signal voltage that is functional of the difference between said input voltages, a rate amplifier receiving the output of said phase-sensitive rectifier, a reset circuit and power amplifier receiving the output of said rate amplifier, and means for converting the electrical signal output of the power amplifier into a force functional thereof.

36. In a system for regulating an instrumentality in response to the change in a variable from a predetermined value and for restoring the variable to said predetermined value, a sensing element adapted to detect said change, means controlled by said sensing element for supplying an alternating current signal input voltage corresponding to the magnitude of said change detected by said sensing element, means for supplying an alternating current set point input voltage of the same phase as said signal input voltage, means for comparing said voltages and producing an output that is either in phase with or 180° out of phase with the input signal depending on whether the signal input voltage exceeds or is less than the set point input voltage and which varies in magnitude with the difference between said voltages, a phase-sensitive rectifier for converting the output of said comparing means into a direct current signal voltage that is functional of the difference between said input voltages, a reset circuit and power amplifier responsive to said direct current signal voltage, and means for converting the electrical signal output of the power amplifier into a force functional thereof.

37. In a system for regulating an instrumentality in response to the change in a variable from a predetermined value and for restoring the variable to said predetermined value, a sensing element adapted to detect said change, means controlled by said sensing element for supplying an alternating current signal input voltage corresponding to the magnitude of said change detected by said sensing element, means for supplying an alternating current set point input voltage of the same phase as said signal input voltage, means for comparing said voltages and producing an output that is either in phase with or 180° out of phase with the input signal depending on whether the signal input voltage exceeds or is less than the set point input voltage and which varies in magnitude with the difference between said voltages, a phase-sensitive rectifier for converting the output of said comparing means into a direct current signal voltage that is functional of the difference between said input voltages, and means responsive to said direct current signal voltage for creating a force functional thereof.

38. In a system of the type described, means for supplying an alternating current signal input voltage of variable magnitude, means for supplying an alternating current set point input voltage of relatively fixed magnitude and of the same phase as said signal input voltage, electronic means for comparing said variable signal input and said constant set point input voltages comprising an electronic valve means, grid circuit means connecting the output of one of said input voltage supply means to the grid of said electronic valve means, cathode circuit means for attenuating the output of the other of said input voltage supply means and connecting the same to the cathode of said electronic valve means, whereby the attenuation causes the effects of equal signals impressed on said cathode and grid circuit means to be substantially equal, said electronic valve means having an alternating output voltage the magnitude of which is zero when said input signals are equal, and means for amplifying the output of said electronic valve means.

39. In a system of the type described, a phase-sensitive rectifier for converting an alternating current signal voltage that varies in amplitude and phase into a direct current voltage whose amplitude is functional of the amplitude of said alternating current voltage and which is of one sign when said alternating current voltage is in phase with a reference voltage from an alternating current source and of the opposite sign when said alternating current voltage is 180° out of phase with said reference voltage, said phase-sensitive rectifier having a center point connection to one terminal of the source of said alternating current reference voltage and two outer points, one of which is connected to the other terminal of said source, and comprising a rectifier circuit adapted to produce a direct current voltage between said one of said outer points and said center point, a second rectifier circuit adapted to produce a direct current voltage of the same polarity between the other of said outer points and said center point, circuit means for connecting said alternating current signal voltage across said outer points, one of said rectifier circuits being adjustable so that the voltage across said outer points is zero when the alternating current signal is zero, whereby an alternating current signal in phase with the reference voltage produces a direct current voltage of one sign between said outer points and an alternating current signal out of phase with said reference voltage produces a direct current voltage of opposite sign between said outer points.

References Cited in the file of this patent

UNITED STATES PATENTS

| | | |
|---|---|---|
| Re. 21,804 | Gorrie | May 21, 1941 |
| 1,870,851 | Jones | Aug. 9, 1932 |
| 2,271,876 | Seeley | Feb. 3, 1942 |
| 2,310,298 | Kuhl et al. | Feb. 9, 1943 |
| 2,339,635 | Hall | Jan. 18, 1944 |
| 2,364,881 | Tyrner | Dec. 12, 1944 |
| 2,507,606 | McLeod | May 16, 1950 |
| 2,530,387 | Goertz | Nov. 21, 1950 |
| 2,539,127 | Glass | Jan. 23, 1951 |
| 2,546,657 | Smoot | Mar. 27, 1951 |
| 2,585,377 | Eisler et al. | Feb. 12, 1952 |
| 2,588,799 | Booth | Mar. 11, 1952 |
| 2,620,441 | McCoy et al. | Dec. 2, 1952 |
| 2,601,867 | Alyea | July 1, 1952 |
| 2,651,011 | Hornfeck | Sept. 1, 1953 |
| 2,657,341 | Covert | Oct. 27, 1953 |